(12) United States Patent
Fujii

(10) Patent No.: US 6,542,113 B2
(45) Date of Patent: Apr. 1, 2003

(54) GLOBAL POSITIONING SYSTEM

(75) Inventor: Tomohiro Fujii, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/866,715

(22) Filed: May 30, 2001

(65) Prior Publication Data

US 2001/0050630 A1 Dec. 13, 2001

(30) Foreign Application Priority Data

May 31, 2000 (JP) ........................................ 2000-166453

(51) Int. Cl.⁷ ................................................ G01S 5/14
(52) U.S. Cl. ............................... 342/357.02; 342/357.1
(58) Field of Search ..................... 342/357.06, 357.02, 342/357.03, 357.12, 357.1, 357.09; 701/214, 215

(56) References Cited

U.S. PATENT DOCUMENTS

| | | | | |
|---|---|---|---|---|
| 4,445,118 A | * | 4/1984 | Taylor et al. | 342/357.09 |
| 5,955,987 A | * | 9/1999 | Murphy et al. | 342/357.06 |
| 5,990,825 A | * | 11/1999 | Ito | 342/357.03 |
| 6,313,786 B1 | * | 11/2001 | Sheynblat et al. | 342/357.02 |
| 6,329,945 B1 | * | 12/2001 | Hynes | 342/357.06 |

FOREIGN PATENT DOCUMENTS

| | | |
|---|---|---|
| GB | 2 293 710 A | 4/1996 |
| GB | 2 349 760 A | 11/2000 |
| GB | 2 358 977 A | 8/2001 |

* cited by examiner

Primary Examiner—Gregory C. Issing
(74) Attorney, Agent, or Firm—McGinn & Gibb, PLLC

(57) ABSTRACT

A global positioning system is provided, which ensures accurate recognition of the position of a GPS terminal even if the radio section of a GPS terminal receives the GPS radio wave affected by extrinsic noise. This system comprises (a) at least one GPS terminal for receiving a GPS radio wave transmitted from a GPS satellite and for generating positional information of the terminal based on information contained in the radio wave received; and (b) a GPS base station for detecting degradation of the GPs radio wave due to extrinsic noise and for transmitting a control signal containing information on the degradation of the radio wave to the at least one terminal. The at least one terminal conducts its operation to optimize reception condition or state of the GPS radio wave based on the control signal received. Preferably, the at least one terminal comprises a function to eliminate the degradation of the GPS radio wave due to an interference radio wave.

16 Claims, 14 Drawing Sheets

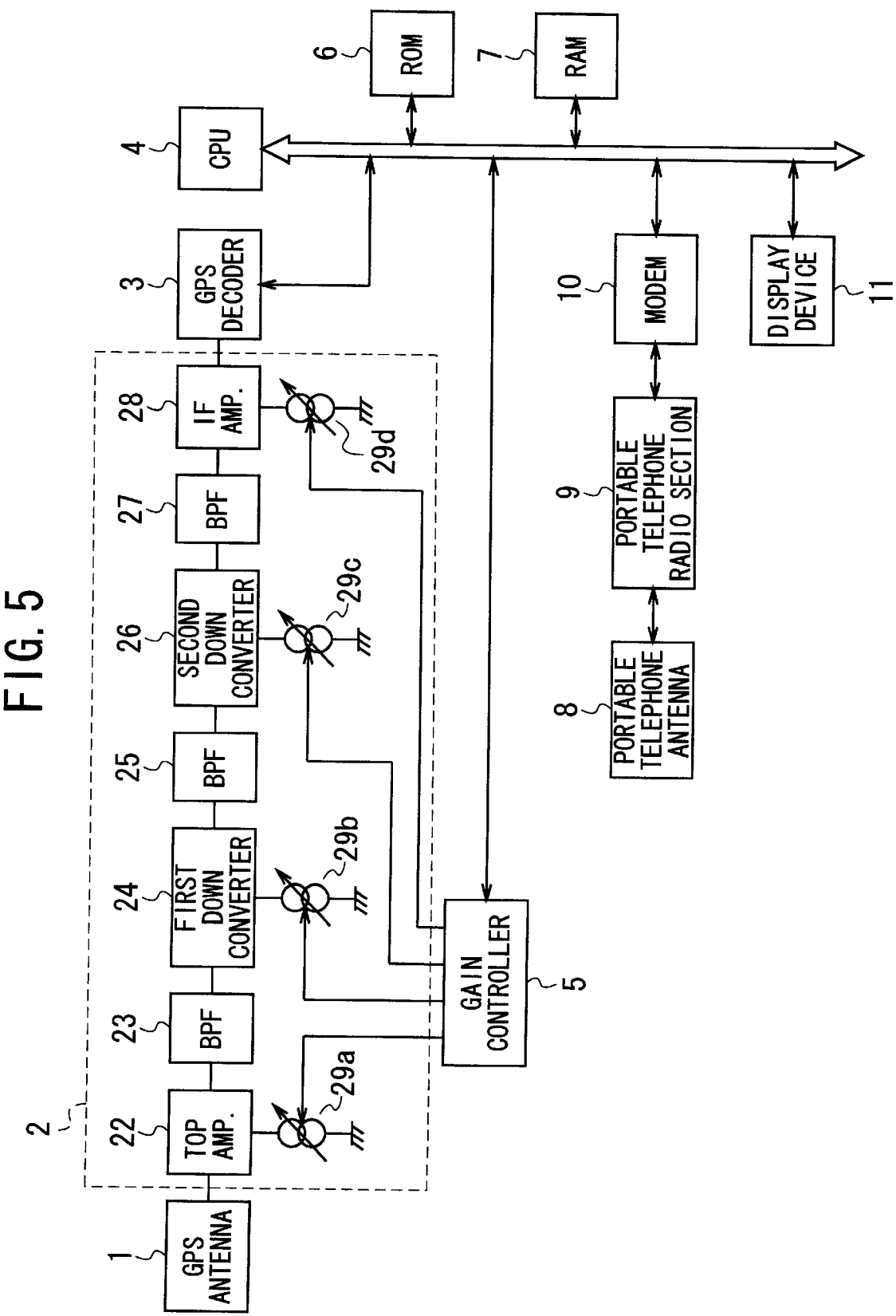

GLOBAL POSITIONING SYSTEM

BACKGROUND OF THE INVENTION

1. Field of the Invention

The present invention relates to a Global Positioning System (GPS). More particularly, the invention relates to a global positioning system including at least one GPS satellite that transmits a GPS radio wave, at least one GPS base station, and at least one GPS terminal that generates positional information on the terminal itself on the surface of the earth, in which the reception state or condition of the terminal is optimized so as to compensate degradation of the GPS radio wave the terminal received due to cosmic and/or atmospheric noise with the use of a control signal from the at least one base station.

2. Description of the Related Art

Generally, the intensity or strength of the GPS radio wave transmitted from a GPS satellite at the earth's surface is approximately constant. Specifically, the intensity is typically kept at approximately −130 dBm. Therefore, the radio section of a GPS terminal is designed to conduct its operation optimally at the typical intensity of approximately −130 dBm.

However, actually, the radio wave intensity at the earth's surface tends to fluctuate due to extrinsic noise, such as cosmic noise and atmospheric noise. Also, it is affected by interference wave with another radio system.

Thus, if the radio section of the GPS terminal receives the GPS radio wave affected by the extrinsic noise, there arises a problem that the GPS terminal is unable to recognize its position accurately on the earth's surface. As a result, there has been the need to solve this problem.

SUMMARY OF THE INVENTION

Accordingly, an object of the present invention is to provide a global positioning system that ensures accurate recognition of the position of a GPS terminal even if the radio section of a GPS terminal receives the GPS radio wave affected by extrinsic noise.

Another object of the present invention is to provide a global positioning system that makes it possible to optimize reception operation of a GPS radio wave even if the radio section of a GPS terminal receives the GPS radio wave affected by extrinsic noise.

Still another object of the present invention is to provide a global positioning system that eliminates the effect by an interference radio wave with another radio system.

The above objects together with others not specifically mentioned will become clear to those skilled in the art from the following description.

A global positioning system according to a first aspect of the present invention comprises:

(a) at least one GPS terminal for receiving a GPS radio wave transmitted from a GPS satellite and for generating positional information of the terminal based on information contained in the radio wave received; and (b) a GPS base station for detecting degradation of the GPS radio wave due to extrinsic noise and for transmitting a control signal containing information on the degradation of the radio wave to the at least one terminal;

wherein the at least one terminal conducts its operation to optimize reception condition or state of the GPS radio wave based on the control signal received.

With the global positioning system according to the present invention, when the strength or intensity of the GPS radio wave on the surface of the earth (i.e., arriving radio wave intensity at the earth's surface) degrades due to extrinsic noise such as cosmic noise (e.g., solar noise) and/or atmospheric noise (e.g., rainfall-inducing noise) and/or interference radio waves, the GPS base station detects the degradation of the GPS radio wave. Then, the base station transmits the control signal containing the information on the degradation of the GPS radio wave to the at least one GPS terminal by way of an appropriate radio medium (e.g., a mobile telephone network). On the basis of the information in the control signal transmitted by the base station, the terminal conducts its operation to optimize reception condition or state of the GPS radio wave.

As a consequence, even if the strength or intensity of the GPS radio wave on the earth's surface (i.e., the arriving radio wave intensity at the earth's surface) degrades due to some extrinsic noise or interference radio waves, the GPS terminal can receive the radio wave transmitted at the optimum condition or state.

In a preferred embodiment of the system according to the invention, the at least one terminal comprises a function to eliminate the degradation of the GPS radio wave due to an interference radio wave.

In another preferred embodiment of the system according to the invention, the at least one terminal comprises a receiver for receiving the control signal transmitted from the base station, an amplifier for amplifying a signal contained in the GPS radio wave, and a gain controller for controlling a gain of the amplifier. The gain controller adjusts the gain of the amplifier according to the information contained in the control signal about the degradation of the GPS radio wave.

In this embodiment, it is preferred that the gain controller increases the gain of the amplifier by increasing a current supplied to the amplifier.

In still another preferred embodiment of the system according to the invention, the at least one terminal comprises a receiver for receiving the control signal transmitted from the base station, an amplifier for amplifying a signal contained in the GPS radio wave, and a gain controller for controlling a gain of the amplifier. The gain controller adjusts the gain of the amplifier according to the information contained in the control signal about the degradation of the GPS radio wave. The gain controller increases the gain of the amplifier to lower an impedance of the amplifier and restricts a bandwidth of a peripheral circuit of the amplifier, thereby suppressing a noise component of an output of the amplifier.

In this embodiment, it is preferred that an additional amplifier is further provided after the amplifier. A gain of the additional amplifier is controlled in such a way as to prevent a total gain of the amplifiers from being excessive.

In this embodiment, it is preferred that a band-pass filter is further provided after the amplifier. A passband of the band-pass filter is controlled in such a way as to suppress the noise component of the output of the amplifier.

In this embodiment, a band-pass filter may be further provided between a GPS antenna and the amplifier. A passband of the band-pass filter is controlled in such a way as to suppress the noise component of the output of the amplifier.

In a further preferred embodiment of the system according to the invention, a noise eliminator is additionally provided for eliminating a noise component of the amplifier.

In this embodiment, preferably, the noise eliminator identifies a noise frequency band of an interference radio wave by detecting a peak frequency of the interference radio wave. The noise eliminator eliminates the noise frequency band.

In this embodiment, preferably, the noise eliminator includes a function of eliminating a noise component of the amplifier higher than a specific level.

A GPS terminal according to a second aspect of the invention comprises:
  (a) an antenna for receiving a GPS radio wave transmitted from a GPS satellite, producing an output;
  (b) a radio section for amplifying the output of the antenna, producing an output;
  (c) a decoder for decoding the output of the radio section, generating positional information of the terminal based on information contained in the radio wave received; and
  (d) a gain controller for controlling a gain of the radio section;
    wherein the radio section receives a control signal about degradation of the GPS radio wave due to extrinsic noise transmitted from a base station;
    and wherein the gain controller controls the radio section in such a way that reception operation of the terminal for the GPS radio wave is optimized based on the control signal received.

BRIEF DESCRIPTION OF THE DRAWINGS

In order that the present invention may be readily carried into effect, it will now be described with reference to the accompanying drawings.

FIG. 5 is a functional block diagram showing the detailed configuration of the system according to the first embodiment of FIG. 1, in which the configuration of the GPS radio section is illustrated in detail.

DETAILED DESCRIPTION OF THE PREFERRED EMBODIMENTS

Figure 1:
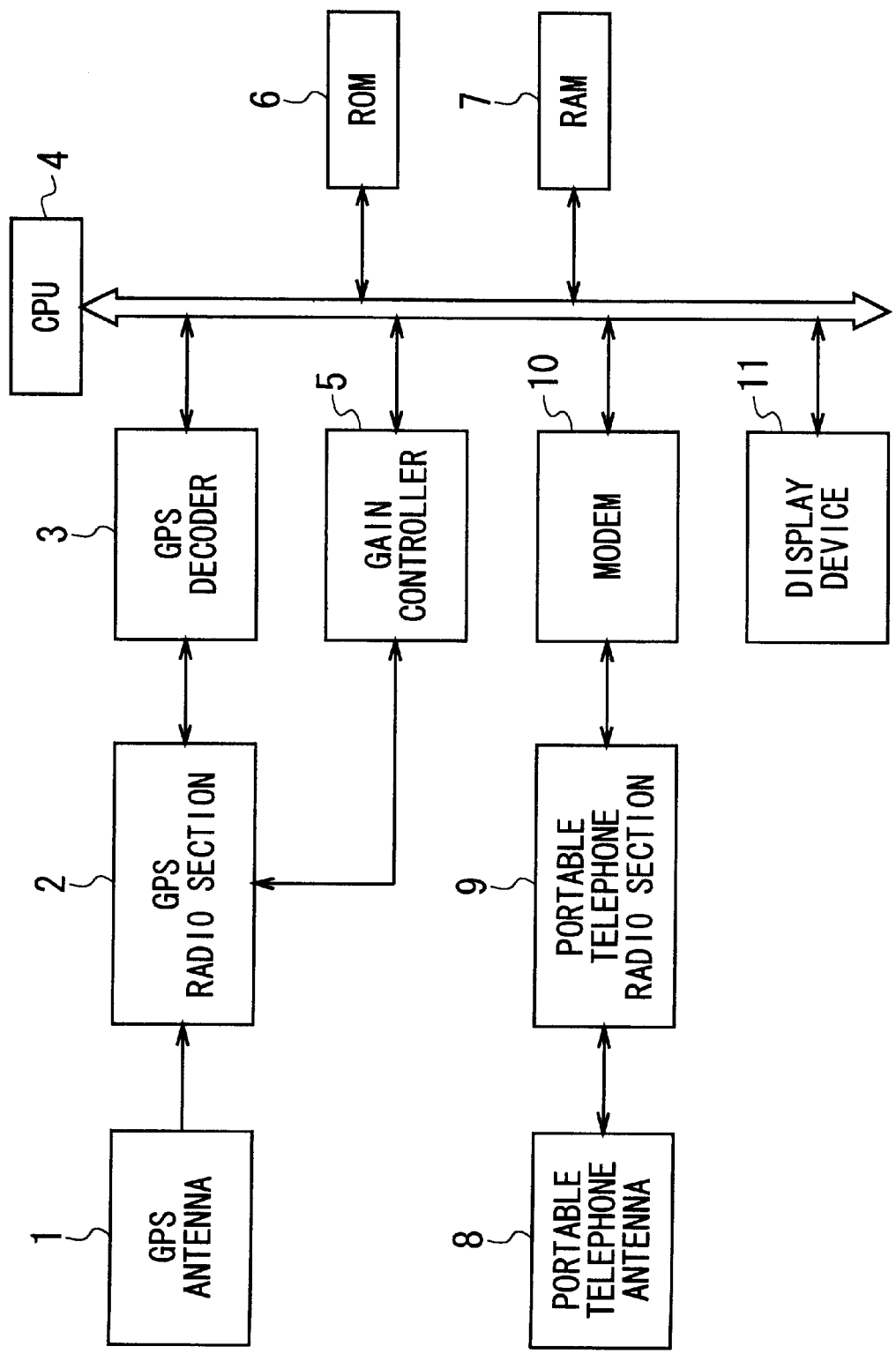
FIG. 1 is a functional block diagram showing the schematic configuration of a global positioning system according to a first embodiment of the invention.

Preferred embodiments of the present invention will be described in detail below while referring to the drawings attached.

First Embodiment

Figure 2:
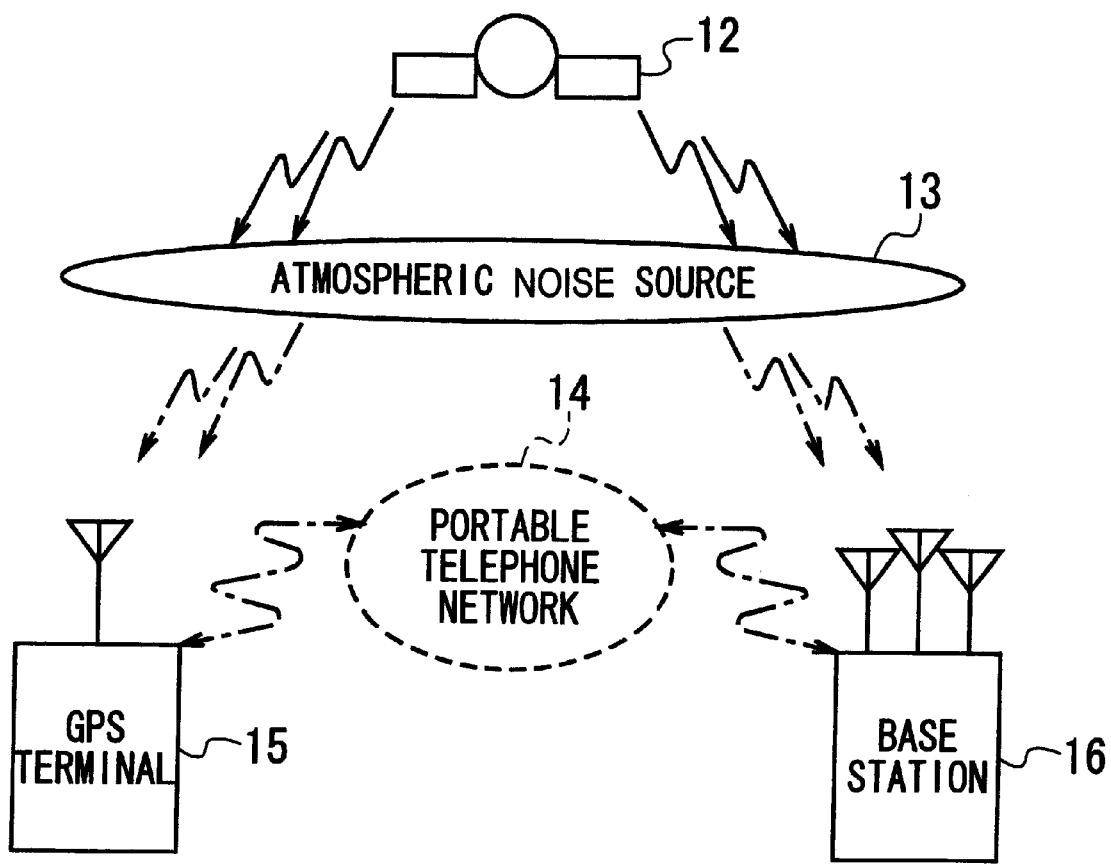
FIG. 2 is a schematic diagram showing the operation of the system according to the first embodiment of FIG. 1.

The configuration of a global positioning system according to a first embodiment of the invention is schematically shown in FIG. 2.

In FIG. 2, a GPS satellite 12, which circles around the earth, transmits a specific GPS radio wave toward the earth's surface. A GPS terminal 15 and a base station 16, which are provided on the earth's surface, receive the GPS radio wave from the satellite 12. The terminal 15 and the station 16 are capable of communication with each other by way of a portable telephone network 14 provided on the earth's surface.

The GPS radio wave transmitted from the satellite 12 tends to be affected by an atmospheric noise source 13 (e.g., rainfall) and/or a cosmic noise source (e.g., solar noise, not shown). If the GPS radio wave intensity at the earth's surface degrades due to some noise, the station 16 detects the degradation of the GPS radio wave and then, the station 16 transmits specific control information to the terminal 15 by way of the network 14, thereby informing the terminal 15 of occurrence of the GPS radio wave degradation. According to the control information thus transmitted, the terminal 15 adjusts its operation to optimize the reception condition or state of the GPS radio wave.

The GPS terminal 15 has the configuration shown in FIG. 1. As shown in FIG. 1, the terminal 15 comprises a GPS antenna 1, a GPS radio section 2, a GPS decoder 3, a CPU 4, a gain controller 5, a Read-Only Memory (ROM) 6, a Random-Access Memory (RAM) 7, a portable telephone antenna 8, a portable telephone radio section 9, a modem 10, and a display device 11. The antenna 8, radio section 9, and the modem 10 constitute the communication block. The GPS antenna 1, the GPS radio section 2, the GPS decoder 3, and the gain controller 5 constitute the GPS block. The CPU 4 controls the entire operation of the terminal 15 according to a program stored in the ROM 6.

The ROM 6 is used to store a program for conducting the specific operation of the terminal 15, map information, and other necessary information.

The modem 10 is used to connect the terminal 15 to the GPS base station 16 or the Internet with the antenna 8 by way of the portable telephone network 14. When the terminal 15 receives the control information transmitted from the base station 16, the information is sent to the CPU 4 by way or the antenna 8, the radio section 8, and the modem 10. According to the information thus sent, the CPU 4 controls the operation of the GPS radio section 2 through the gain controller 5 in such a way as to have an optimum receiving condition of the GPS radio wave.

The positional information of the terminal 15 contained in the GPS radio wave is sent to the GPS decoder 3 through the antenna 1 and the radio section 2. In the decoder 3, the latitude and longitude data representing the current position of the terminal 15 is calculated and then, sent to the CPU 4. The current position of the terminal 15 is displayed on the screen of the display device 11 according to the latitude and longitude data thus calculated.

In the system of the first embodiment, the calculation operation of the current position of the terminal 15 maybe conducted with a positional information server instead of the GPS decoder 3. This is easily realized by using a so-called network-dependent GPS system. The map information, which is used to display the map on the display device 11, may be downloaded from a specific site through the Internet and the network 14 instead of reading out from the ROM 6. Since the so-called network-dependent GPS system and the way to download the information through the Internet are well known, the explanation on these techniques are omitted here.

Figure 3:
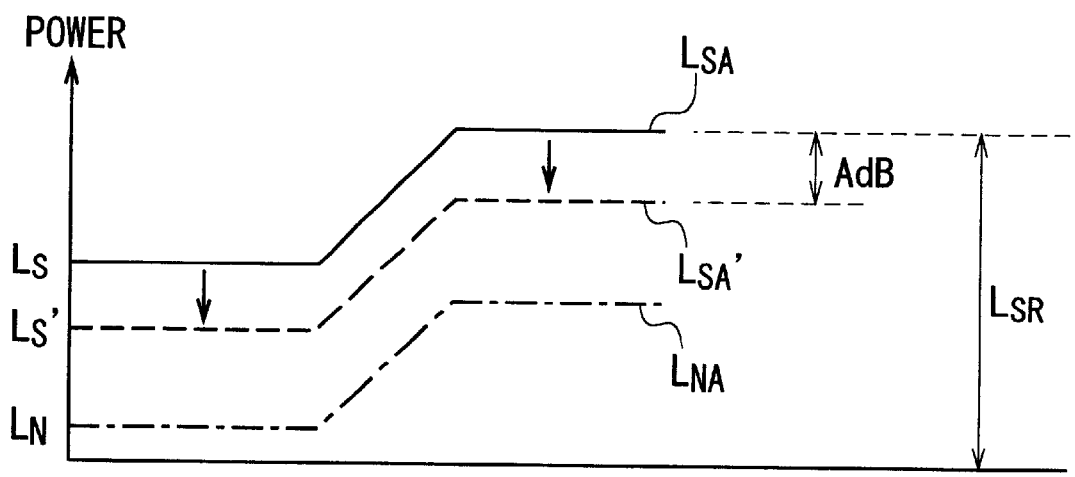
FIG. 3 is a schematic diagram showing an example of degradation of the intensity of the GPS radio wave arrived at the earth's ground.
Figure 4:
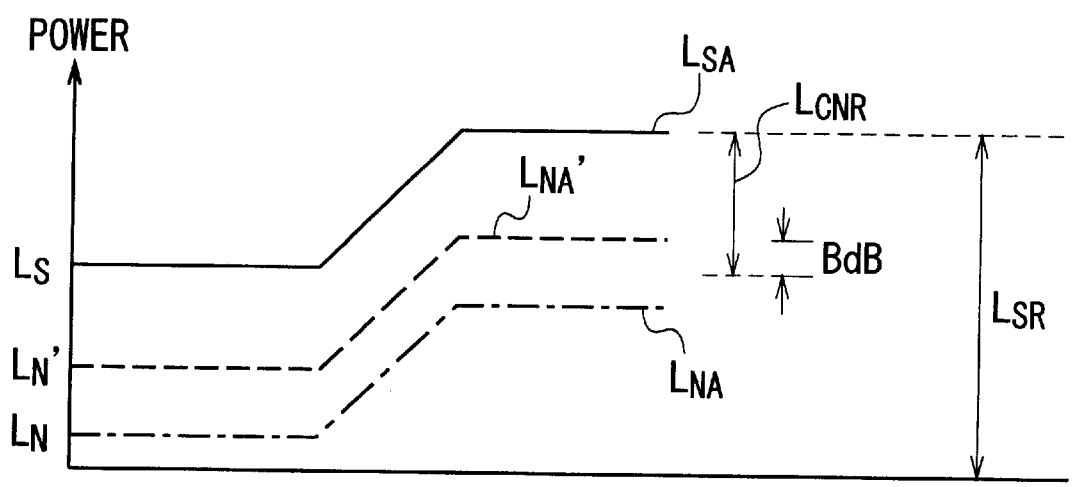
FIG. 4 is a schematic diagram showing another example of degradation of the intensity of the GPS radio wave arrived at the earth's ground.

The degradation of the GPS radio wave is caused by decrease of the signal component or increase of the noise component. FIG. 3 shows schematically the relationship between the power level of the signal component of the input radio signal to the GPS terminal 15 and that of the noise component thereof, where the signal component level $L_S$ lowers to $L_S'$. FIG. 4 shows schematically the same relationship as FIG. 3, where the noise component level $L_N$ rises up to $L_N'$.

As shown in FIG. 3, the input signal has a power level $L_S$ of the signal component and a power level $L_N$ of the noise component initially. Since the signal is amplified with an amplifier in the GPS radio section 2 prior to demodulation, it has an amplified level $L_{SA}$ of the signal component and an amplified level $L_{NA}$ of the noise component. "$L_{SR}$" denotes the required level of the input signal for demodulation.

If the initial signal component lowers in such a way as to have a power level $L_S'$, the amplified signal component has an amplified level $L_{SA}'$, where the difference of $L_{SA}'$ from $L_S'$ is A dB. Thus, the level $L_{SA}'$ of the degraded signal component is lower than the required level $L_{SR}$ for demodulation. This means that the level of the signal component needs to be raised by A dB, in other words, the gain of the amplifier in the GPS radio section 2 needs to be increased by A dB.

On the other hand, as shown in FIG. 4, if the initial noise component rises in such a way as to have a power level $L_N'$ from $L_N$, the amplified noise component has an amplified level $L_{NA}'$, where "$L_{CNR}$" is a required carrier-to-noise ratio (C/N). Thus, the level $L_{NA}'$ of the increased noise component is higher than the required C/N level for demodulation by B dB. This means that the level of the noise component needs to be lowered, in other words, the noise level needs to be suppressed without changing the gain of the amplifier in the GPS radio section 2.

Generally, the gain and the Noise Figure (NF) of the amplifier in the GPS radio section 2 vary dependent on the reference current flowing through the amplifier. If the reference current increases, the gain of the amplifier rises and at the same time, the dc impedance thereof lowers, resulting in lowering of the ac impedance and NF.

Moreover, the noise level N is expressed as N=kBT, where k is the Boltzmann constant, T is the absolute temperature, and B is the bandwidth. Since the temperature T is the ambient temperature of the GPS terminal 15 used, it can be thought to be approximately constant. Therefore, it is said that the noise level N is proportional to the bandwidth B. The narrower the bandwidth B is, the lower the noise N is.

With a typical amplifier for receivers of this type, the narrower the bandwidth is, the lower the gain is. Therefore, the current flowing through the amplifier needs to be increased for the purpose of a desired gain value. Also, for the signal to noise ratio (S/N), the first amplification stage of the amplifier is dominant. Thus, the S/N can be improved by lowering the NF of the first amplification stage.

Typically, the GPS radio wave intensity on the earth's surface is approximately constant (i.e., approximately 130 dbm). Therefore, the reference current, gain, and bandwidth of the amplifier in the GPS terminal 15 are optimized to accord with this intensity.

It is not preferred to increase the current of the amplifier, because the lifetime of batteries becomes shorter. Thus, it is preferred that the current of the amplifier is changed as necessary. If the signal component of the GPS radio wave decreases due to extrinsic noise, the current is increased to raise the gain of the whole amplifier according to the signal component decrease. If so, the terminal 15 always receives the radio wave in the optimum reception state or condition.

If the noise component of the GPS radio wave increases due to extrinsic noise, the current is increased to lower the NF of the amplifier according to the noise component increase. If the amplifier comprises a peripheral circuit for reducing the bandwidth of the amplifier, the noise level is lowered by the bandwidth reduction due to the increase of the current. In this case, if the gain increase of the amplifier is excessive, the current or currents to the amplifier or amplifiers in the next stage or stages is/are decreased, thereby adjusting the overall gain of the receiver at an appropriate value. Thus, the terminal 15 always receives the radio wave in the optimum reception state or condition as well.

FIG. 5 shows the detailed configuration of the GPS radio section 2 of the GPS terminal 15, in which the radio section 2 has a typical "double super heterodyne" configuration. However, the section 2 may be have any other configuration, such as a "single super heterodyne" or "direct conversion" configuration.

In FIG. 5, the GPS radio section 2 comprises a top amplifier (i.e., a first stage amplifier) 22, a first band-pass filter (BPF) 23, a first down converter 24, a second BPF 25, a second down converter 26, a third BPF 27, an Intermediate Frequency (IF) amplifier (i.e., a second stage amplifier) 28, and first to fourth variable current sources 29a, 29b, 29c, and 29d. The overall gain of the radio section 2 is adjusted according to the instruction transmitted from the GPS base station 16, which is carried out by the gain controller 5.

The first variable current source 29a controls the current supplied to the top amplifier 22 by way of the gain controller 5. The second variable current source 29b controls the current supplied to the first down converter 24 by way of the gain controller 5. The third variable current source 29c controls the current supplied to the second down converter 26 by way of the gain controller 5. The fourth variable current source 29d controls the current supplied to the IF amplifier 28 by way of the gain controller 5.

Figure 6A:
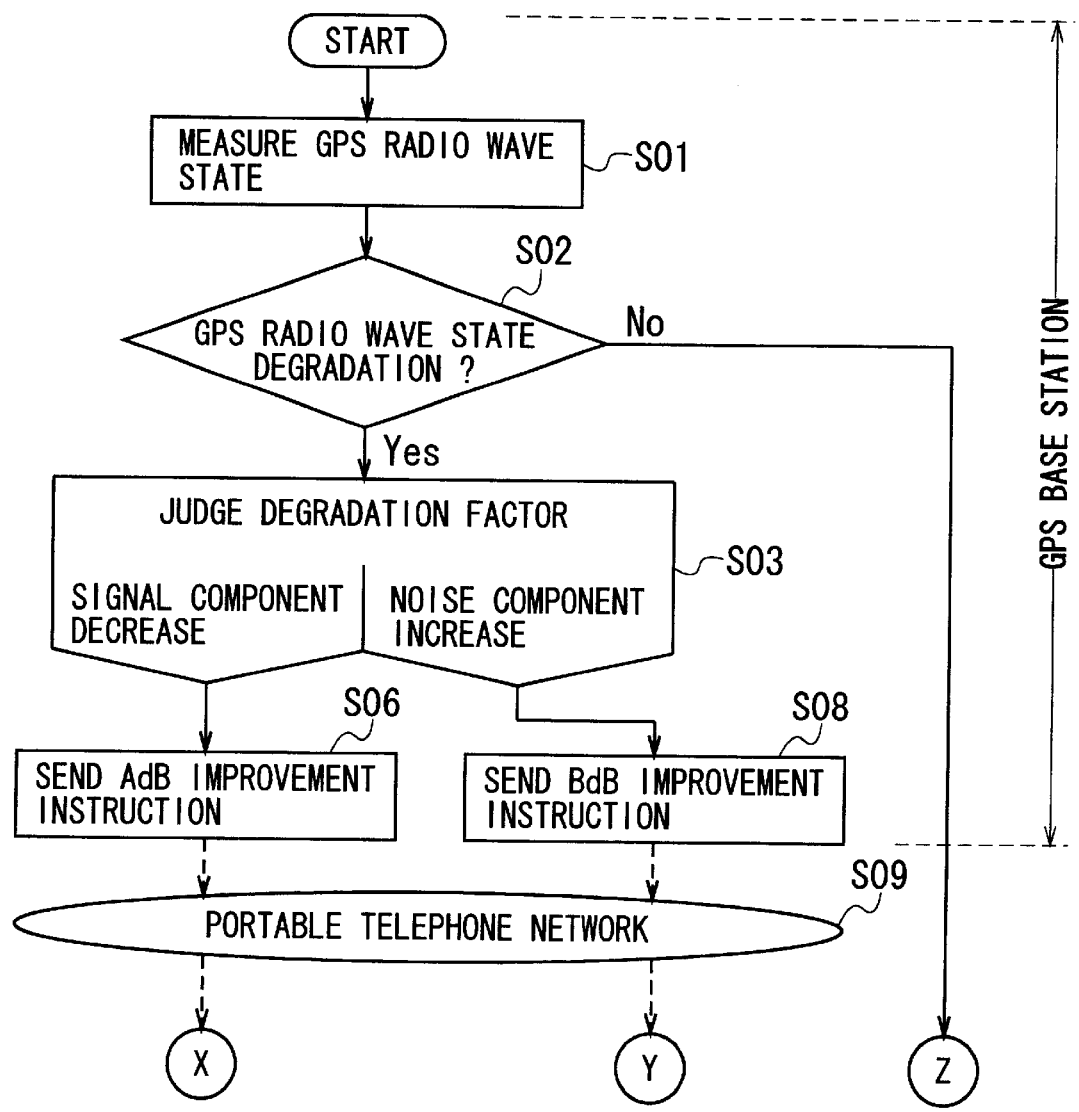
FIGS. 6A and 6B are a flowchart showing the operation of the system according to the first embodiment of FIG. 1.
Figure 6B:
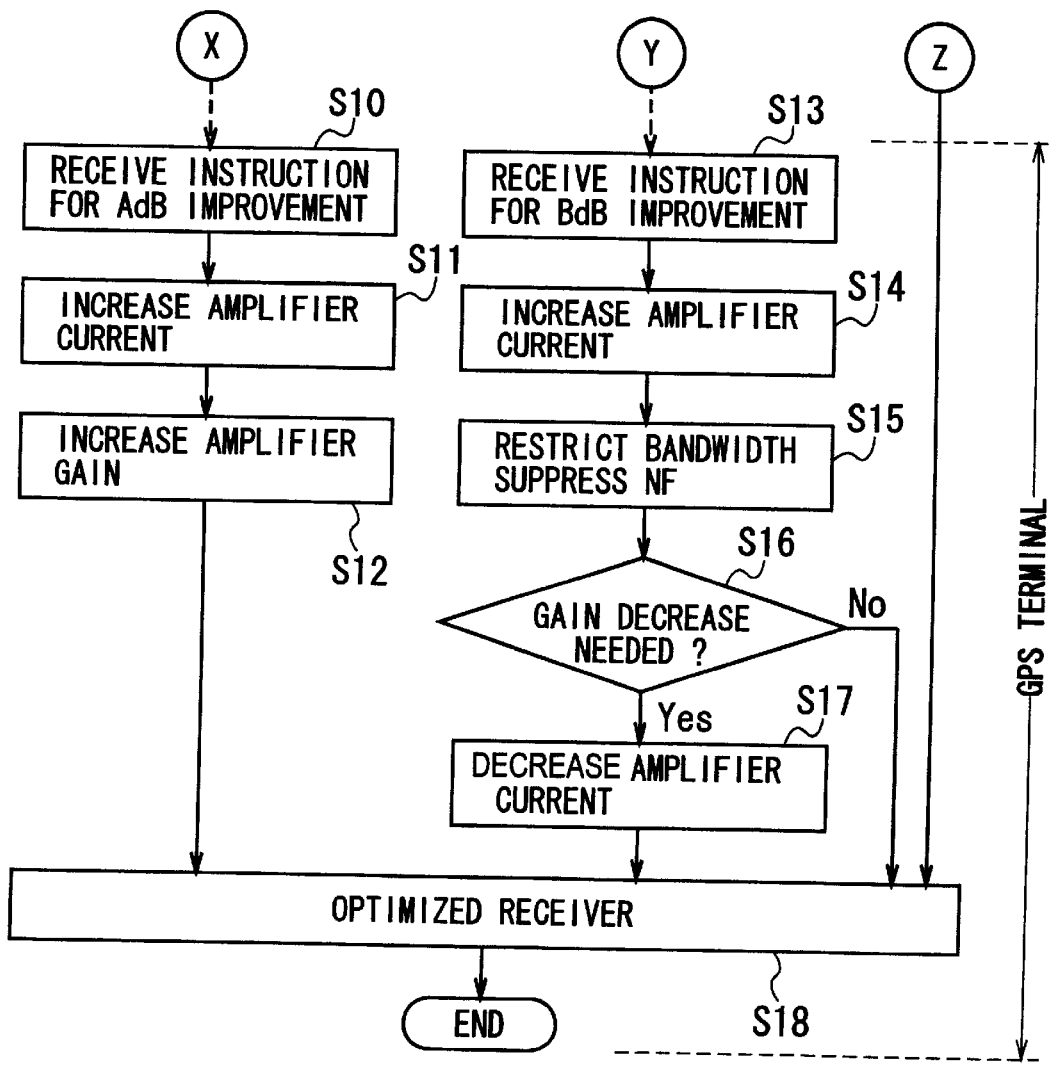

FIGS. 6A and 6B show the operation of the global positioning system according to the first embodiment.

First, the base station 16 measures the state of the GPS radio wave transmitted from the satellite 12 in the step S01. Next, the station 16 checks whether or not the current state of the radio wave includes some degradation in the step S02.

As explained above, the degradation of the state of the radio wave is caused by decrease of the signal component of the wave or increase of the noise component thereof. Therefore, in the step S02, the station 16 judges whether or not the radio wave received contains any one of these two factors or causes.

When the judgment result is "yes" in the step S02, next, the station 16 judges which one of these two factors the received wave contains in the step S03. When the station 16 judges that the received wave contains the signal component decrease in the step S03, the station 16 sends the GPS terminal 15 an instruction to improve the signal component by A dB by way of the portable telephone network 14 in the step S06. The terminal 15 receives the instruction by way of the portable telephone network 14 in the step S10.

When the terminal 15 receives the instruction from the base station 16 in the step S10, the instruction is sent to the gain controller 5. Then, the controller 5 increases at least one of the currents supplied to the top amplifier 22, the first and second down converters 24 and 26, and the IF amplifier 28 in the step S11. Thus, the total gain of the amplifiers in the section 2 is increased by A dB in the step S12. As a result, the operating condition of the receiver of the GPS radio section 2 is optimized in the step S18.

On the other hand, when the base station 16 judges that the received wave contains the noise component increase in the step S03, the station 16 sends the GPS terminal 15 an instruction to improve the noise component by B dB by way of the portable telephone network 14 in the step S08. The portable telephone network 14 transmits the instruction to the terminal 15 in the step S09. The terminal 15 receives the instruction in the step S13.

When the terminal 15 receives the instruction from the base station 16 in the step S13, the instruction is sent to the gain controller 5. Then, the controller 5 increases the current supplied to the top amplifier 22 in the step S11 in the step S14. Thus, the impedance in the amplifier 22 is lowered. Moreover, since the peripheral circuit of the amplifier 22 supplied with a current, the bandwidth of the peripheral circuit is restricted, thereby suppressing the NF of the amplifier 22 in the step S15. Thus, the level of the noise component of the received wave is decreased by B dB.

Thereafter, in the step S16, the terminal 15 judges whether or not the increased current supplied to the top amplifier 22 to lower the NF makes the gain excessive. In other words, the terminal 15 judges whether or not the increased gain needs to be decreased.

When the result of the judgment is "yes" in the step S16, one of the currents supplied to the first and second down converters 24 and 26 and the IF amplifier 28 is decreased by the gain controller 5 according to the instruction of the CPU 4 in the step S17. This is to suppress not to be much greater than the required power level $L_{SR}$ of the signal component of the radio wave shown in FIG. 4. As a result, the operating condition of the receiver of the GPS radio section 2 is optimized in the step S18.

When the result of the judgment is "no" in the step S16, the operation in the step S17 is omitted and then, the operating condition of the receiver of the GPS radio section 2 is directly optimized in the step S18.

In addition, when the result of the judgment in the step S02 is "no", the state of the GPS radio wave includes no degradation. In this case, the terminal 15 has the expected power level of the signal component and the expected C/N and therefore, the flow is immediately jumped to the step S18 from the step S02.

As explained above, with the GPS system according to the first embodiment, when some degradation occurs in the state or condition of the GPS radio wave, the base station 16 detects the degradation and transmits an instruction signal to the terminal 15 according to the type and level of the degradation. The terminal 15 receives the instruction signal and then, optimizes the reception operation according to the type and level of the degradation. Thus, the terminal 15 always receives the GPS radio wave even if the wave degrades due to some extrinsic noise.

Moreover, the adjustment of the operation of the GPS radio section 2 for optimization (e.g., the increase of the supply current) is carried out as necessary and thus, there arises no problem that the battery power is wasted. This means that the battery lifetime of the terminal 15 does not decrease.

In the first embodiment, the reception condition of the receiver of the GPS terminal 15 is optimized by controlling the currents supplied to the amplifiers 22 and 28 and the down converters 24 and 26. However, the invention is not limited to this configuration. The overall NF of the radio section 2 may be lowered by controlling the bandwidth of at least one of the BPFs 23, 25, and 27. As a filter capable of varying its bandwidth, any type of current-controlling gyrator filters or that of switched capacitor filters may be used. Since these techniques are known well, no explanation is presented here.

Figure 14:
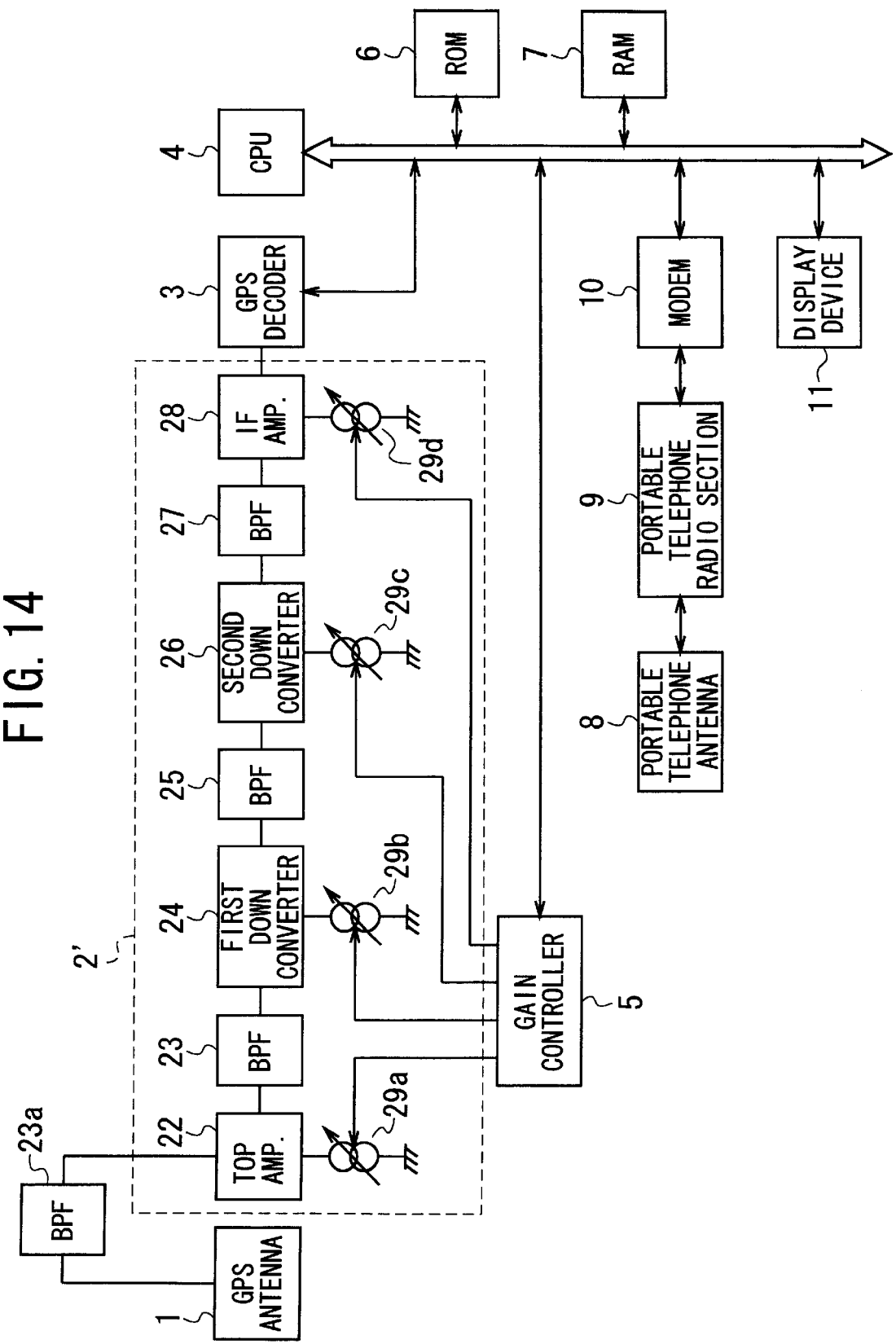
FIG. 14 is a functional block diagram showing a variation of the GPS system according to the first embodiment of FIG. 1, in which an additional BPF is provided between the GPS antenna and the top amplifier.

Also, in the first embodiment, three BPFS 23, 25, and 27 are provided between the top amplifier 22 and the IF amplifier 28. However, it is needless to say that the invention is not limited to this configuration. An additional BPF 23a may be added between the GPS antenna 1 and the top amplifier 22, as shown in FIG. 14. In this case, it is sufficient that the bandwidth of the additional BPF 23a alone is suppressed in order to restrict the overall NF of the section 2'.

Second Embodiment

Figure 7:
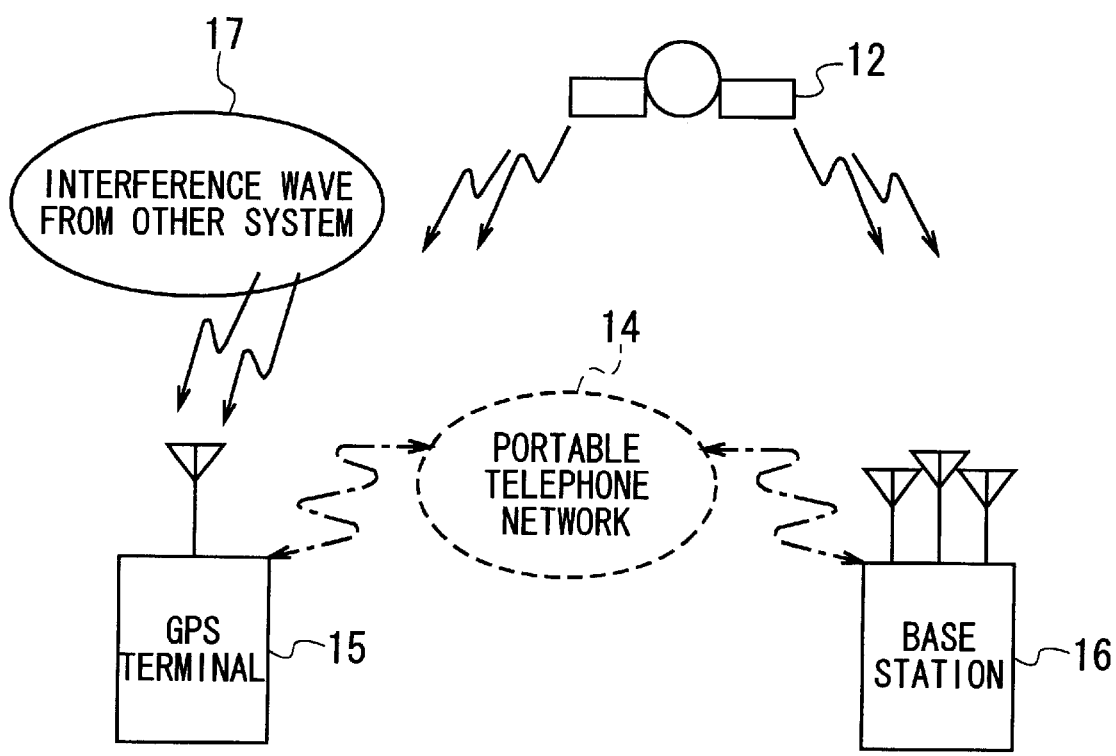
FIG. 7 is a schematic diagram showing the operation of a global positioning system according to a second embodiment of the invention.

FIG. 7 shows a global positioning system according to a second embodiment of the invention, which has the same configuration as that of FIG. 2 and which copes with an interference radio wave from some other system.

Figure 8A:
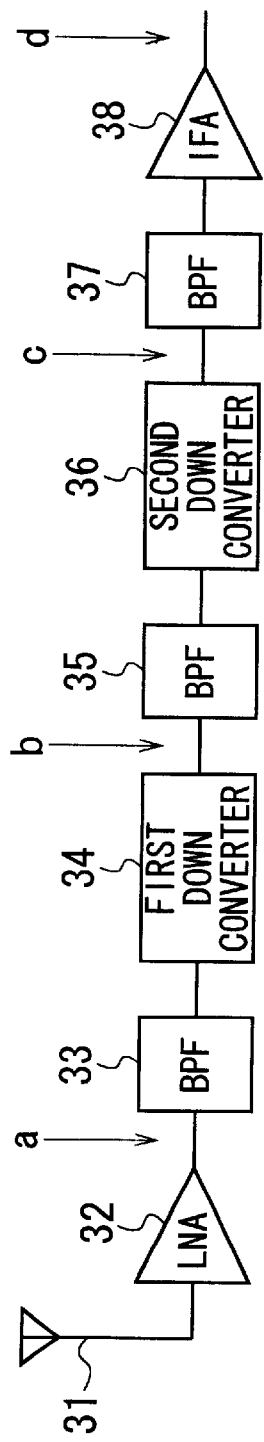
FIG. 8A is a functional block diagram showing the detailed configuration of the system according to the second embodiment of FIG. 7, in which the configuration of the GPS radio section is illustrated in detail.
Figure 8B:
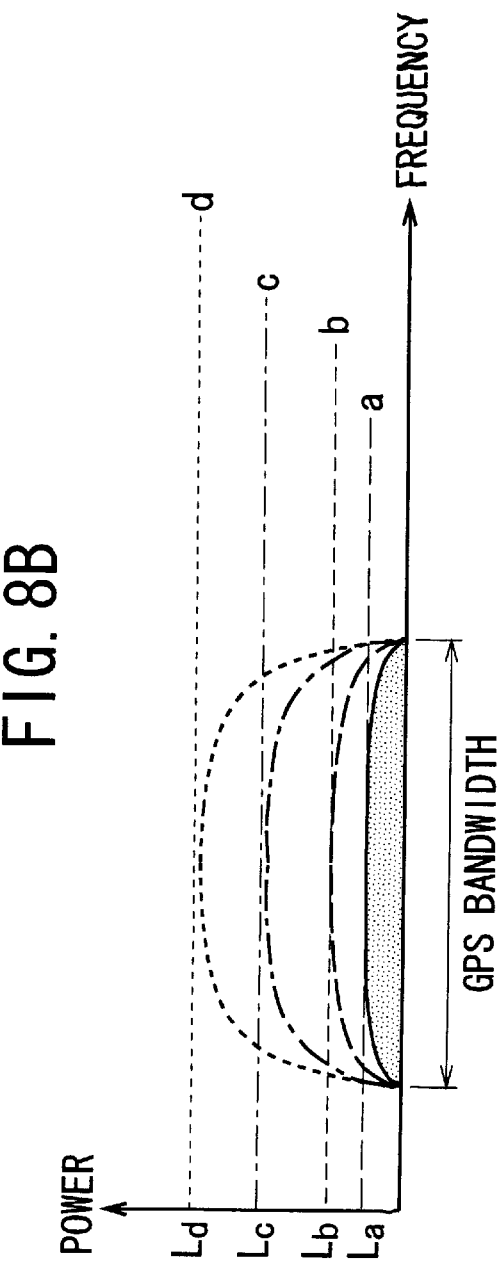
FIG. 8B is a graph showing the electric power spectrum of the outputs of the respective blocks in the system according to the second embodiment of FIG. 7.

As explained above in the first embodiment, the GPS radio wave intensity on the earth's surface is approximately constant (i.e., approximately 130 dBm) if it is hardly affected by extrinsic noise such as the cosmic and atmospheric noise. Also, if the GPS radio section 2 in FIG. 1 comprises a typical configuration (i.e., the double super heterodyne configuration), as shown in FIG. 8A, the outputs of a low-noise amplifier (LNA) 32, a first down converter 34, a second down converter 36, and an IF amplifier 38 have desired power spectrums with their peak levels La, Lb, Lc, and Ld, as shown in FIG. 8B, respectively. The reference numerals 33, 35, and 37 in FIG. 8A denote first, second, and third band-pass filters, respectively. However, if some noise spectrum exists in the GPS bandwidth, a problem will occur.

Figure 9A:
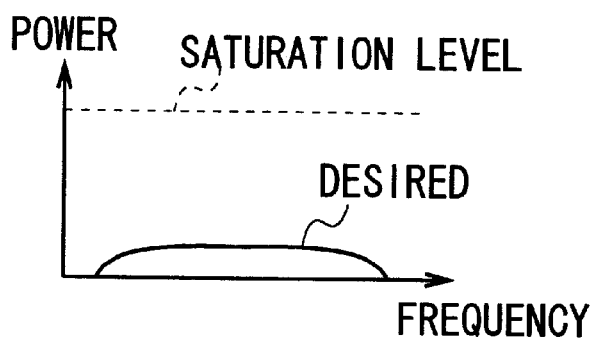
FIG. 9A is a graph showing the electric power spectrum of the input of the amplifier in the system according to the second embodiment of FIG. 7 when no interference wave exists.
Figure 9B:
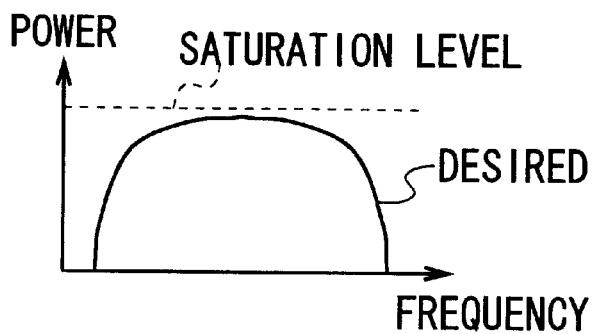
FIG. 9B is a graph showing the electric power spectrum of the output of the amplifier in the system according to the second embodiment of FIG. 7 when no interference wave exists.
Figure 9C:
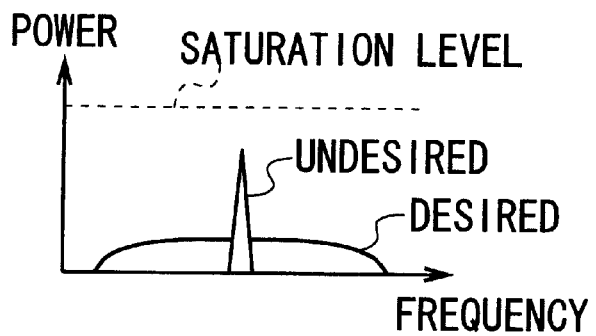
FIG. 9C is a graph showing the electric power spectrum of the input of the amplifier in the system according to the second embodiment of FIG. 7 when some interference wave exists.
Figure 9D:
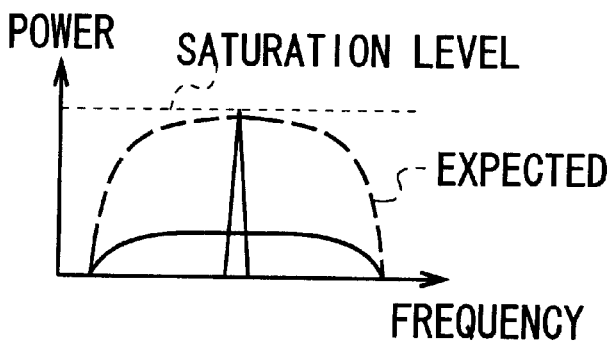
FIG. 9D is a graph showing the electric power spectrum of the output of the amplifier in the system according to the second embodiment of FIG. 7 when some interference wave exists.

Specifically, when no interference radio wave exists, the input GPS radio wave has a desired signal spectrum shown in FIG. 9A and the output of the IF amplifier 38 has a desired, amplified signal spectrum shown in FIG. 9B. In this case, the output of the amplifier 38 does not exceed its saturation level. Unlike this, when some interference radio wave exists, the input GPS radio wave has not only a desired signal spectrum but also an undesired noise spectrum, as shown in FIG. 9C. Typically, the noise spectrum has a higher peak level than the signal spectrum. Therefore, in this case, the noise component of the amplified output of the amplifier 38 reaches its saturation level while the signal component thereof is kept at a low level, as shown in FIG. 9D. This means that the amplified signal component of the output of the amplifier 38 is much lower than its expected level. The system of the second embodiment solves this problem.

Figure 10:
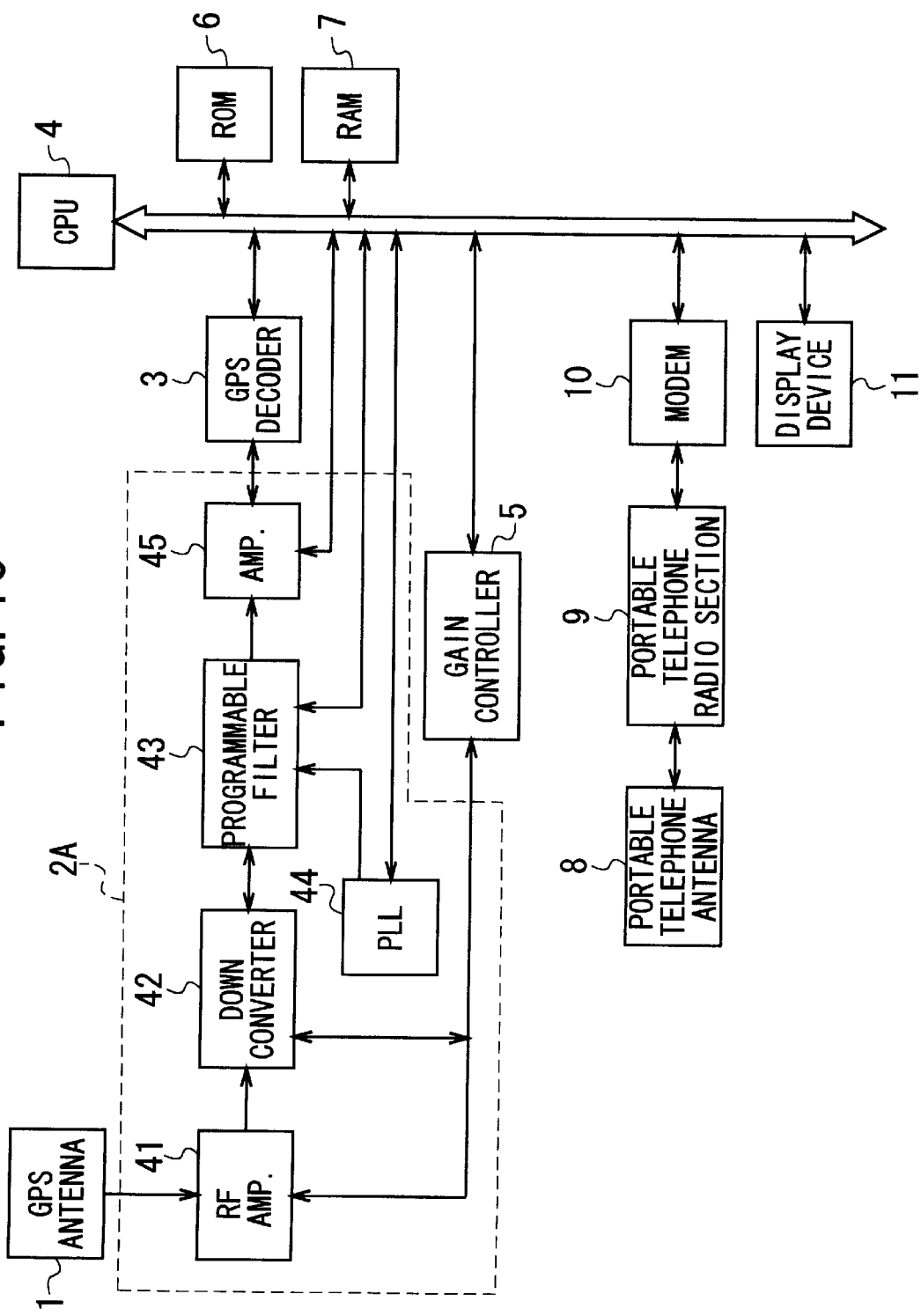
FIG. 10 is a functional block diagram showing the detailed configuration of the system according to the second embodiment of FIG. 7, in which the configuration of the GPS radio section is illustrated in detail.

FIG. 10 shows the configuration of the GPS terminal 15 according to the second embodiment, which is the same in configuration as FIG. 5 except for a GPS radio section 2A. Therefore, the explanation about the same configuration as the first embodiment is omitted here for the sake of simplification.

Unlike the radio section 2 shown in FIG. 5, the radio section 2A comprises a radio-frequency (RF) amplifier 41, which is often called a low-noise amplifier (LNA), a down converter 42, a programmable filter 43, a phase-locked loop (PLL) circuit 44, and an amplifier 45.

The RF amplifier 41 amplifies the RF input signal sent from the GPS antenna 1 within the specific GPS bandwidth. The down converter 42 converts the frequency of the RF input signal to the baseband frequency. The programmable filter 43 eliminates the noise. The PLL circuit 44 supplies a specific local frequency for the conversion operation of the down converter 42 and scans the frequency within the GPS bandwidth to detect the frequency of the interference radio wave. The amplifier 45 amplifies the output of the filter 43 up to the desired power level $L_{SR}$ in FIG. 4.

The down converter 42 includes an inter-stage filter (not shown) for filtering the output of the RF amplifier 41. The converter 42 maybe formed by a combination of several down converter functions. The filter 43 includes a comparator for detecting the power level of the output of the converter 42 and can control the frequency band characteristic, the central frequency and the type of the filter. The gain controller 5 controls the gains of the amplifier 41 and the converter 42 and the other necessary parameters like the first embodiment.

Figure 11:
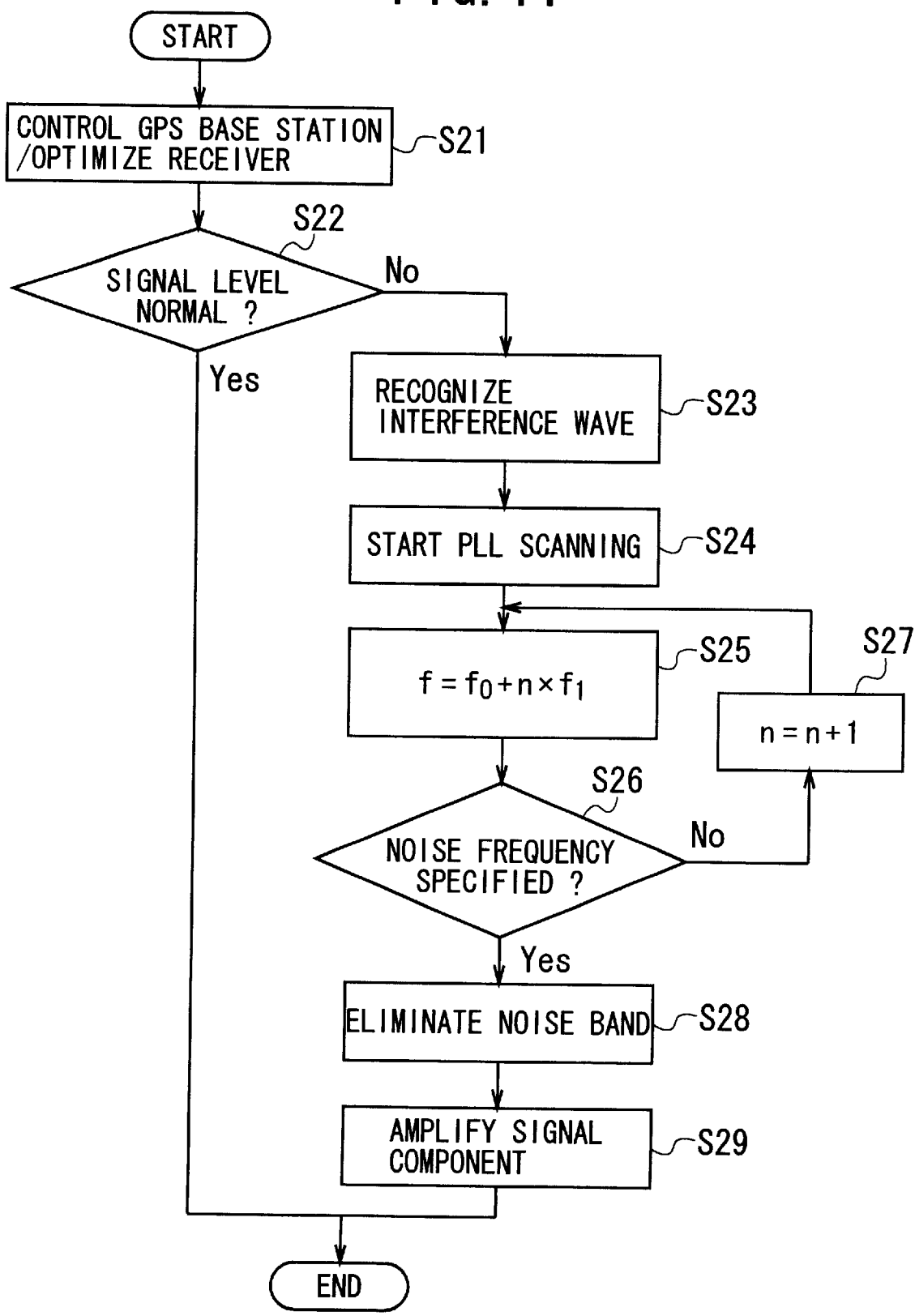
FIG. 11 is a flowchart showing the operation of the GPS system according to the second embodiment of FIG. 7.

FIG. 11 shows the flowchart showing the operation of the terminal 15 according to the second embodiment.

In the step S21, the operation of the receiver in the terminal 15 is optimized in the same way as the first embodiment. The programmable filter 43 is configured to serve as a wide bandwidth band-pass filter by way of the CPU 4 in such a way as to allow the signals within the GPS bandwidth to pass through the same. The frequency of the PLL circuit 44 is adjusted to mix down the central frequency of the GPS bandwidth by way of the CPU 4.

In the step S22, it is judged whether or not the optimized output of the down converter 42 satisfies an expected or desired level. This judgment is carried out with the comparator provided in the programmable filter 43. The result of this judgment is sent to the CPU 4. When the optimized output of the down converter 42 does not satisfy the expected or desired level, in other words, the optimized output of the down converter 42 is lower than the expected or desired level, it is judged that an interference radio wave exists in the GPS bandwidth and the step S23 is carried out. When the optimized output of the down converter 42 satisfies the expected or desired level, the flow is finished without any operation for eliminating the noise due to the interference wave.

In the step S23, to recognize the interference radio wave, the programmable filter 43 is configured to serve as a narrow-band band-pass filter with the CPU 4. Then, in the step S24, the passband of the narrow-band band-pass filter is changed or scanned using the PLL circuit 44, thereby specifying or identifying the peak frequency of the interference wave with the comparator in the PLL circuit 44. This scanning operation of the frequency f is performed from the lowest frequency $f_0$ up to a specific highest frequency at an increment frequency $f_1$ in the steps S25, S26, and S27.

When the peak frequency of the interference wave (i.e., the noise frequency) is specified or identified in the step S26, the reference or local frequency of the PLL circuit 44 is returned to the initial frequency. In the step S27, the programmable filter 43 is configured to serve as the combination of a band-elimination filter (BEF) for eliminating the noise bandwidth containing the noise frequency thus recognized and a band-pass filter for passing the signal bandwidth with the CPU 4. Thus, the noise component due to the interference radio wave is eliminated by the BEF function of the filter 43 while allowing the signal component to pass through the filter 43.

It is known that spread spectrum technique used in GPS is capable of demodulating the input signal without any problem even if part of the spectrum within the GPS bandwidth is eliminated. Therefore, the elimination operation of the noise bandwidth containing the noise frequency in the step S28 does not occur any other problem.

In the step S29, the signal component (i.e., the output of the programmable filter 43) is amplified with the amplifier 45. Thereafter, the flow of FIG. 11 is finished and then, the amplified signal component thus produced is sent to the GPS decoder 3, in which it is demodulated to generate the positional information transmitted from the satellite 12.

As explained above, with the GPS system according to the second embodiment, the extrinsic noise induced by the interference radio wave can be eliminated.

In the second embodiment, the programmable filter 43 may have any other configuration and any other functions than those explained above. For example, the filter 43 is configured to serve as combination of a wideband band-pass filter for allowing the GPS bandwidth to pass, a narrowband band-pass filter for use with the frequency scanning operation, and a band-elimination filter for eliminating the noise bandwidth containing the noise frequency. In this case, each of the wideband band-pass filter and the narrowband band-pass filter may have a fixed passband.

As the programmable filter 43, any type of adaptive filters, current-controlling gyrator filters whose central frequency can be changed by the current supplied, or switched capacitor filters may be used. Since these elements are known well, no explanation is presented here.

Third Embodiment

Figure 12:
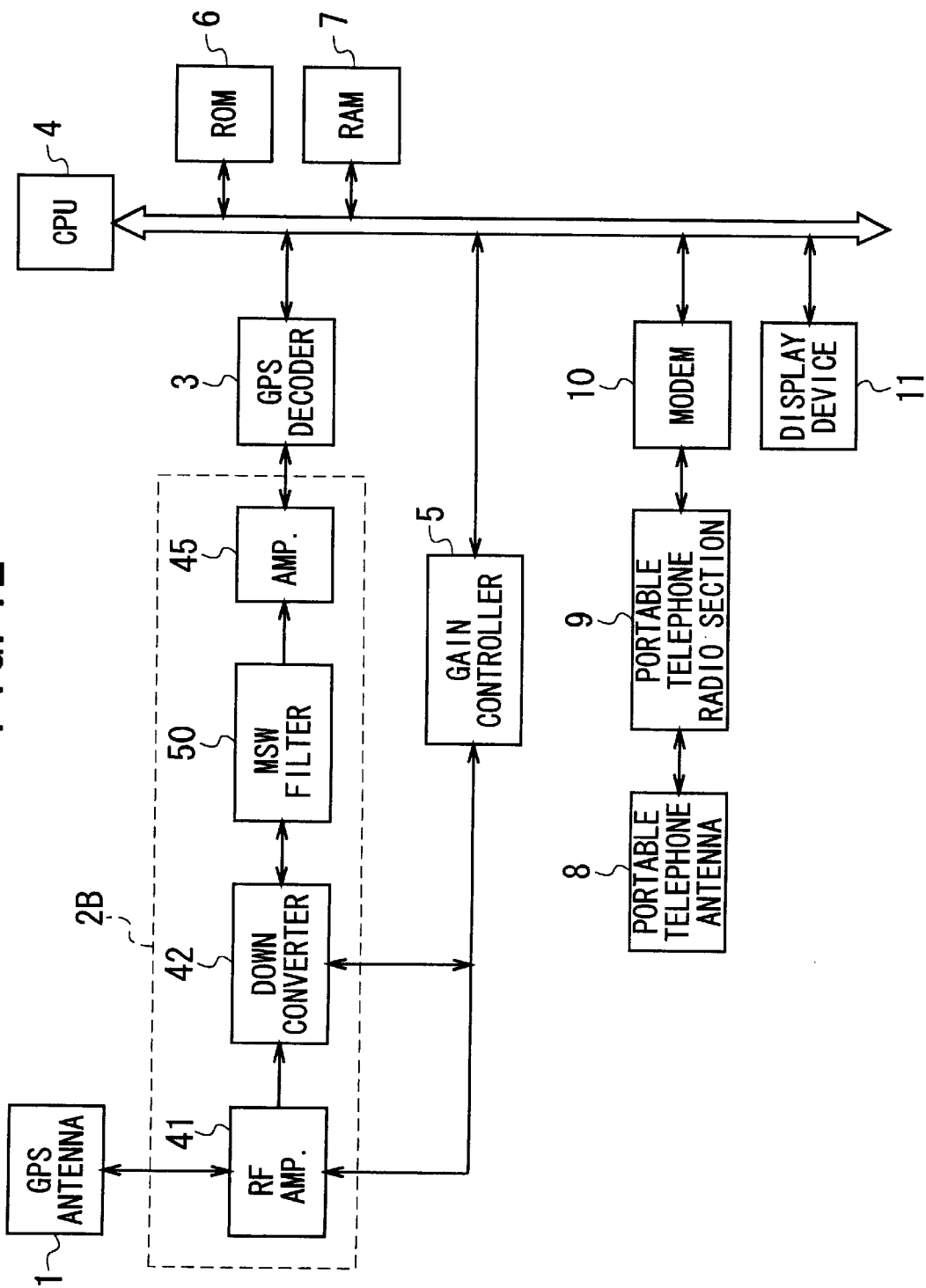
FIG. 12 is a functional block diagram showing the detailed configuration of a global positioning system according to a third embodiment of the invention, in which the configuration of the GPS radio section is illustrated in detail.

FIG. 12 shows the configuration of the terminal 15 used for a global positioning system according to a third embodiment of the invention. Like the second embodiment, the terminal 15 has the same configuration as that of FIG. 2 and copes with an interference radio wave from some other system. However, the way to eliminate the interference noise is different from the second embodiment.

The configuration of the terminal 15 shown in FIG. 12 is the same as that of FIG. 10 except for a GPS radio section 2B. Therefore, the explanation about the same configuration as the second embodiment is omitted here for the sake of simplification.

Unlike the radio section 2A shown in FIG. 10, the radio section 2B comprises a MSW filter 50 instead of the combination of the programmable filter 43 and the PLL circuit 44. The scanning operation to identify the noise frequency with the PLL circuit 44 and the noise elimination operation with the programmable filter 43 are not performed in the section 2A. A similar effect is realized by the use of the MSW filter 50.

Figure 13A:
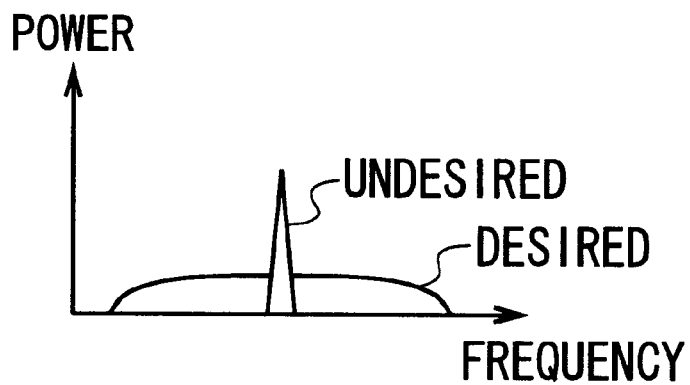
FIGS. 13A and 13B are schematic diagrams showing the operation of removing the interference wave in the system according to the third embodiment of FIG. 12, respectively.
Figure 13B:
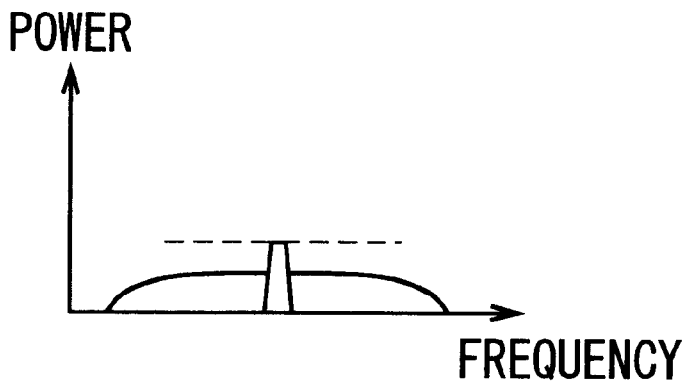

The MSW filter has a function of eliminating the component of a signal higher than a specific power level within a specific bandwidth. If the input GPS radio wave has not only a desired signal spectrum but also an undesired noise spectrum, as shown in FIG. 13A, the noise component in the input signal is selectively eliminated by the MSW filter 50, as shown in FIG. 13B.

The output of the MSW filter 50 is then amplified with the amplifier 45. The output of the amplifier 45 is sent to the GPS decoder 3 in which it is demodulated to generate the positional information transmitted from the satellite 12.

As explained above, with the GPS system according to the third embodiment, the extrinsic noise induced by the interference radio wave can be eliminated.

VARIATIONS

Needless to say, the invention is not limited to the above-described first to third embodiments. The GPS radio section may have any other configuration than those shown in the embodiments if it provides the same or similar function.

While the preferred forms of the present invention have been described, it is to be understood that modifications will be apparent to those skilled in the art without departing from the spirit of the invention. The scope of the present invention, therefore, is to be determined solely by the following claims.

What is claimed is:

1. A global positioning system comprising:
   (a) at least one GPS terminal for receiving a GPS radio wave transmitted from a GPS satellite and for generating positional information of the terminal based on information contained in the radio wave received; and
   (b) a GPS base station for detecting degradation of the GPS radio wave due to extrinsic noise and for transmitting a control signal containing information on the degradation of the radio wave to the at least one terminal,
      wherein the at least one terminal conducts its operation to optimize reception condition or state of the GPS radio wave based on the control signal received,
      wherein the at least one terminal comprises a receiver for receiving the control signal transmitted from the base station, an amplifier for amplifying a signal contained in the GPS radio wave, and a gain controller for controlling a gain of the amplifier, and
      wherein the gain controller adjusts the gain of the amplifier according to the information contained in the control signal about the degradation of the GPS radio wave.

2. The system according to claim 1, wherein the at least one terminal comprises a function to eliminate the degradation of the GPS radio wave due to an interference radio wave.

3. The system according to claim 1, wherein the gain controller increases the gain of the amplifier by increasing a current supplied to the amplifier.

4. The system according to claim 1, wherein the gain controller increases the gain of the amplifier to lower an impedance of the amplifier and restricts a bandwidth of a peripheral circuit of the amplifier, thereby suppressing a noise component of an output of the amplifier.

5. The system according to claim 1, further comprising an additional amplifier provided after the amplifier,
   wherein a gain of the additional amplifier is controlled in such a way as to prevent a total gain of the amplifiers from being excessive.

6. The system according to claim 5, further comprising a band-pass filter provided after the amplifier;
   wherein a passband of the band-pass filter is controlled in such a way as to suppress the noise component of the output of the amplifier.

7. The system according to claim 5, further comprising a band-pass filter provided between a GPS antenna and the amplifier;
   wherein a passband of the band-pass filter is controlled in such a way as to suppress the noise component of the output of the amplifier.

8. The system according to claim 1, further comprising a noise eliminator for eliminating a noise component of the amplifier.

9. The system according to claim 8, wherein the noise eliminator identifies a noise frequency band of an interference radio wave by detecting a peak frequency of the interference radio wave;
   and wherein the noise eliminator eliminates the noise frequency band.

10. The system according to claim 8, wherein the noise eliminator includes a function of eliminating a noise component of the amplifier higher than a specific level.

11. A GPS terminal comprising:
    (a) an antenna for receiving a GPS radio wave transmitted from a GPS satellite, producing an output;
    (b) a radio section for amplifying the output of the antenna, producing an output;
    (c) a decoder for decoding the output of the radio section, generating positional information of the terminal based on information contained in the radio wave received; and
    (d) a gain controller for controlling a gain of the radio section;
       wherein the radio section receives a control signal about degradation of the GPS radio wave due to extrinsic noise transmitted from a base station;
       and wherein the gain controller controls the radio section in such a way that reception operation of the terminal for the GPS radio wave is optimized based on the control signal received.

12. The terminal of claim 11, wherein the radio section comprises an amplifier.

13. The terminal of claim 12, wherein the gain controller adjusts the gain of the amplifier according to the information contained in the control signal.

14. A GPS terminal comprising:
    a radio section for amplifying a GPS radio wave from a first source; and
    a gain controller for controlling a gain of the radio section,
       wherein the radio section receives a control signal from a second source containing information about the degradation of the GPS radio wave from said first source due to an extrinsic noise, wherein said gain controller is adapted to control the gain based upon said information in said control signal.

15. The terminal of claim 14, wherein the gain controller controls the radio section in such a way that a reception operation of the terminal for the GPS radio wave is optimized based on the control signal.

16. The terminal of claim 14, wherein the radio section comprises an amplifier.

* * * * *